US008842586B2

(12) United States Patent  
Nammi et al.

(10) Patent No.: US 8,842,586 B2  
(45) Date of Patent: Sep. 23, 2014

(54) METHOD AND APPARATUS FOR ACK/NAK TRANSMISSION IN A TIME DIVISION DUPLEX WIRELESS SYSTEM

(75) Inventors: Sairamesh Nammi, Stockholm (SE); Nishant Batra, Addison, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 344 days.

(21) Appl. No.: 13/164,222

(22) Filed: Jun. 20, 2011

(65) Prior Publication Data

US 2012/0320804 A1    Dec. 20, 2012

(51) Int. Cl.
*H04J 3/00* (2006.01)
*H04L 1/18* (2006.01)
*H04L 1/00* (2006.01)
*H04L 1/16* (2006.01)
*H04L 1/12* (2006.01)

(52) U.S. Cl.
CPC ............ *H04L 1/1607* (2013.01); *H04L 1/1825* (2013.01); *H04L 1/0029* (2013.01); *H04L 1/003* (2013.01); *H04L 2001/125* (2013.01); *H04L 1/1854* (2013.01); *H04L 1/1621* (2013.01)
USPC ........................................................ 370/280

(58) Field of Classification Search
None
See application file for complete search history.

(56) References Cited

U.S. PATENT DOCUMENTS

2011/0128922 A1*  6/2011  Chen et al. .................... 370/329
2012/0044842 A1*  2/2012  Nammi et al. ................ 370/281

* cited by examiner

*Primary Examiner* — Ayaz Sheikh
*Assistant Examiner* — Blanche Wong

(57) ABSTRACT

A base station of a wireless time division duplex network which communicates with a UE having a network interface unit. The base station having a processing unit which determines to use either ACK/NAK bundling or ACK/NAK multiplexing to communicate with the UE through the network interface unit based on predetermined criteria. A method of a base station of a wireless time division duplex network which communicates with a UE to choose either ACK/NAK bundling or ACK/NAK multiplexing having the steps of determining with a processing unit of the base station to use either ACK/NAK bundling or ACK/NAK multiplexing to communicate with the UE through a network interface unit of the base station based on predetermined criteria. There is the step of communicating with the UE through the network interface unit using either ACK/NAK bundling or ACK/NAK multiplexing based on the predetermined criteria.

20 Claims, 3 Drawing Sheets

METHOD AND APPARATUS FOR ACK/NAK TRANSMISSION IN A TIME DIVISION DUPLEX WIRELESS SYSTEM

FIELD OF THE INVENTION

The present invention relates to a base station of a wireless time division duplex network which communicates with a user equipment (UE) that uses either acknowledge (ACK) or non-acknowledge (NAK) bundling or ACK/NAK multiplexing to communicate with the UE based on predetermined criteria. (As used herein, references to the "present invention" or "invention" relate to exemplary embodiments and not necessarily to every embodiment encompassed by the appended claims.) More specifically, the present invention relates to a base station of a wireless time division duplex network which communicates with a UE that uses either ACK/NAK bundling or ACK/NAK multiplexing to communicate with the UE based on the UE's location or based on the UE's speed.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

3GPP LTE radio interface offers high peak data rates, low delays and increase in spectral efficiencies. LTE ecosystem supports both Frequency division duplex (FDD) and Time division duplex (TDD). This enables the operators to exploit both the paired and unpaired spectrum since LTE has flexibility in bandwidth as it supports 6 bandwidths 1.4 MHz, 3 MHz, 5 MHz, 10 MHz, 15 MHz and 20 MHz.

One interesting scenario for deploying LTE in Wireless Communications Service (WCS) band. It is the requirement from FCC to have each UE has a maximum duty cycle of 25% in bands A/B and 12.5% in bands C/D. For a TDD system the requirement from FCC is that maximum duty cycle allowed is 38%. Our simulation results and analysis showed that LTE-TDD is a good candidate for deployment compared to LTE-FDD with UE duty cycle limitation.

Since TDD operation involves one single carrier frequency for both uplink and downlink transmissions, both the base station and the UE must switch from transmission to reception and vice versa. Table 1 shows the transmission format according to the 3GPP standard.

TABLE 1

LTE-TDD transmission formats per frame of 10 ms

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

One fundamental difference between FDD and TDD is that there is no one-to-one association between uplink and downlink in TDD. The other main difference between LTE-FDD and LTE-TDD is related to the transmission of HARQ acknowledgements. For FDD, the acknowledgement of data received in a subframe "n" is transmitted in subframe "n+4", while for TDD, the acknowledgement obviously cannot be transmitted until an uplink subframe occurs. For the uplink heavy (configurations 0, 6) and the symmetric uplink/downlink configurations (configurations 1, 2) each downlink subframe has been associated with an uplink subframe in such a way that acknowledgements from at most one downlink subframe needs to be transmitted in every uplink subframe. However, in configurations where the number of downlink subframes per radio frame larger than the number of uplink subframes (configurations 3, 4, 5) reception of several downlink subframes may need to be acknowledged in a single uplink subframe.

3GPP LTE offers two mechanisms to handle this:
A. ACK/NAK bundling
B. ACK/NAK multiplexing Determining which mechanism to use is configured by the network on a per UE basis. If the UE is allocated ACK/NAK multiplexing then a lot of control signaling is needed for each DL transmission, thus reducing the UL throughput (Coverage). On the other case, if ACK/NAK bundling is used, then DL throughput is affected for some UE's.

BRIEF SUMMARY OF THE INVENTION

The present invention pertains to a base station of a wireless time division duplex network which communicates with a UE. The base station comprises a network interface unit. The base station comprises a processing unit which determines to use either ACK/NAK bundling or ACK/NAK multiplexing to communicate with the UE through the network interface unit based on predetermined criteria.

The present invention pertains to a method of a base station of a wireless time division duplex network which communicates with a UE to choose either ACK/NAK bundling or ACK/NAK multiplexing. The method comprises the steps of determining with a processing unit of the base station to use either ACK/NAK bundling or ACK/NAK multiplexing to communicate with the UE through a network interface unit of the base station based on predetermined criteria. There is the step of communicating with the UE through the network interface unit using either ACK/NAK bundling or ACK/NAK multiplexing based on the predetermined criteria.

In this invention, an intelligent scheme is used to select the ACK/NAK bundling or multiplexing.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 4:
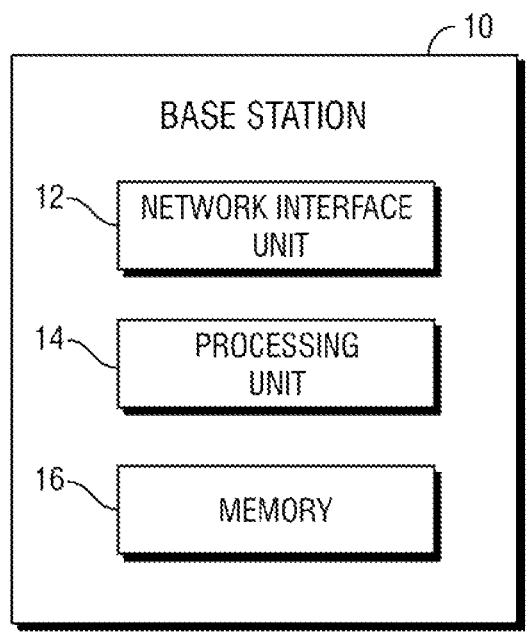
FIG. 4 is a block diagram of a base station of the present invention.

Referring now to the drawings wherein like reference numerals refer to similar or identical parts throughout the several views, and more specifically to FIG. 4 thereof, there is shown a base station 10 (also referred to as enB) of a wireless time division duplex network which communicates with a UE. The base station 10 comprises a network interface unit 12. The base station 10 comprises a processing unit 14 which determines to use either ACK/NAK bundling or ACK/NAK multiplexing to communicate with the UE through the network interface unit 12 based on predetermined criteria.

The criteria may be based on the UE's location. When the UE's location is near a cell edge in the network, the processing unit 14 may use ACK/NAK bundling; otherwise, the processing unit 14 uses ACK/NAK multiplexing. For example, the UE may be near a cell edge when the UE's SINR is less than P_th, where the values of P_th lies between 0- to −4 dB. In another case, the UE may be near a cell edge when the network interface unit 12 receives a Channel Quality Information (CQI) lower than 5 (certain value, it will be in this order). The base station 10 may include a memory 16 having a neighbor list having a number of neighbors, and wherein the UE is near a cell edge when the number of neighbors in the neighbor list is greater than a predetermined number of neighbors. The UE may be near a cell edge based on uplink measurements made by the processing unit 14 with respect to the UE.

The criteria may be based on the UE's speed. When the UE's speed is less than V_th, the processing unit may use ACK/NAK bundling: otherwise, the processing unit may use ACK/NAK multiplexing, where the value of V_th is in between 30-60 Kmph. When the UE's frequency location change rate is less than F_th, the processing unit 14 may use ACK/NAK bundling; otherwise, the processing unit 14 uses ACK/NAK multiplexing, where the value of F_th is in between 1-2 When the UE's rate of change of Channel Quality Information (CQI) is less than C_th, the processing unit 14 may use ACK/NAK bundling; otherwise, the processing unit 14 uses ACK/NAK multiplexing, where the value of C_th is in between 1-2 When the UE's rate of change of PMI is less than R_th, the processing unit uses ACK/NAK bundling; otherwise, the processing unit uses ACK/NAK multiplexing, where the value of R_th is in between 1-2.

The present invention pertains to a method of a base station 10 of a wireless time division duplex network which communicates with a UE to choose either ACK/NAK bundling or ACK/NAK multiplexing. The method comprises the steps of determining with a processing unit 14 of the base station 10 to use either ACK/NAK bundling or ACK/NAK multiplexing to communicate with the UE through a network interface unit 12 of the base station 10 based on predetermined criteria. There is the step of communicating with the UE through the network interface unit 12 using either ACK/NAK bundling or ACK/NAK multiplexing based on the predetermined criteria.

The criteria may be based on the UE's location. There may be the step of the processing unit 14 using ACK/NAK bundling when the UE's location is near a cell edge in the network; otherwise, the processing unit 14 using ACK/NAK multiplexing. The criteria may be based on the UE's speed. There may be the step of the processing unit 14 using ACK/NAK bundling when the UE's speed is less than V_th, the processing unit; otherwise, the processing unit may use ACK/NAK multiplexing, where the value of V_th is in between 30-60 Kmph. There may be the step of the processing unit 14 using ACK/NAK bundling when the UE's frequency location change rate is less than F_th, otherwise, the processing unit 14 uses ACK/NAK multiplexing, where the value of F_th is in between 1-2. There may be the step of the processing unit 14 using ACK/NAK bundling when the UE's rate of change of Channel Quality Information (CQI) is less than C_th, otherwise, the processing unit 14 uses ACK/NAK multiplexing, where the value of C_th is in between 1-2 There may be the step of the processing unit 14 using ACK/NAK bundling when the UE's rate of change of PMI is less than R_th, otherwise, the processing unit uses ACK/NAK multiplexing, where the value of R_th is in between 1-2.

In the operation of the invention, ACK/NAK bundling and multiplexing is now described.

A. ACK/NAK bundling: The bundling mechanism combines the acknowledgements from multiple H-ARQ processes such that a positive acknowledgement will be sent only in case all downlink transmissions were correctly received. The advantage of this method is that only one feedback bit is needed hence reduction in control channel singling, while the drawback is that eNodeB in general can't determine which DL subframe were erroneously decoded, and may hence resort to the simple and conservative solution to retransmit all the transmitted Dl subframes. This can lead to the degradation of DL throughput.

B. ACK/NAK multiplexing: In this method, acknowledgements from multiple H-ARQ processes are explicitly transmitted in an uplink subframe. This provides more detailed information about the decoding results of the downlink transmissions. In this case the overhead is expected to be higher as compared to the bundling.

In general, cell edge UE terminals experience low SINR. In these cases all the subframes either are decoded correctly or not decoded. For these cases ACK/NAK bundling is the right choice.

Figure 1:
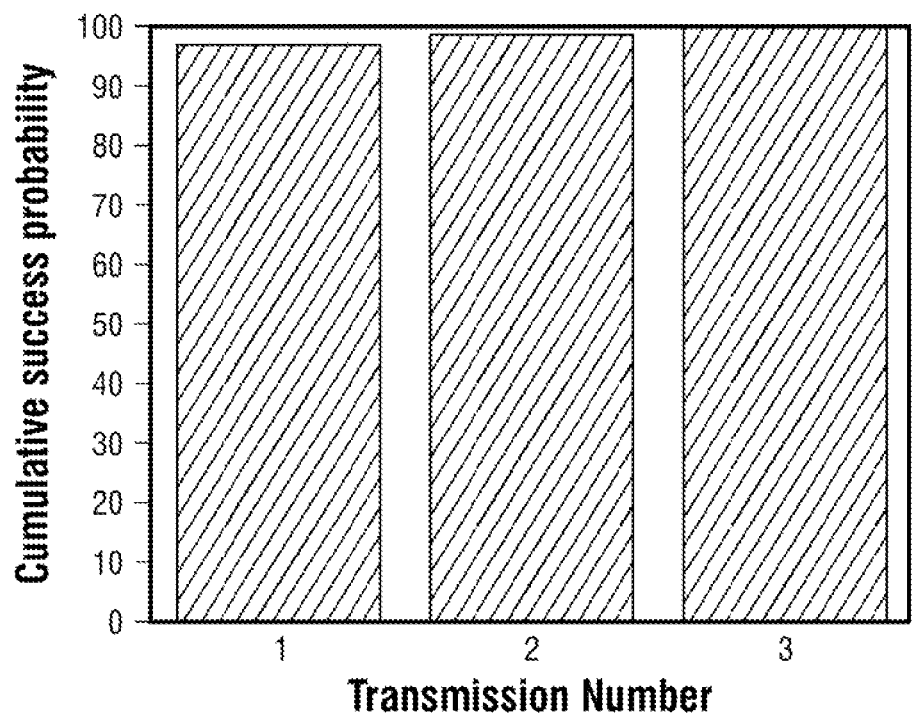
FIG. 1 shows the cumulative success probability for 3 Kmph channel.
Figure 2:
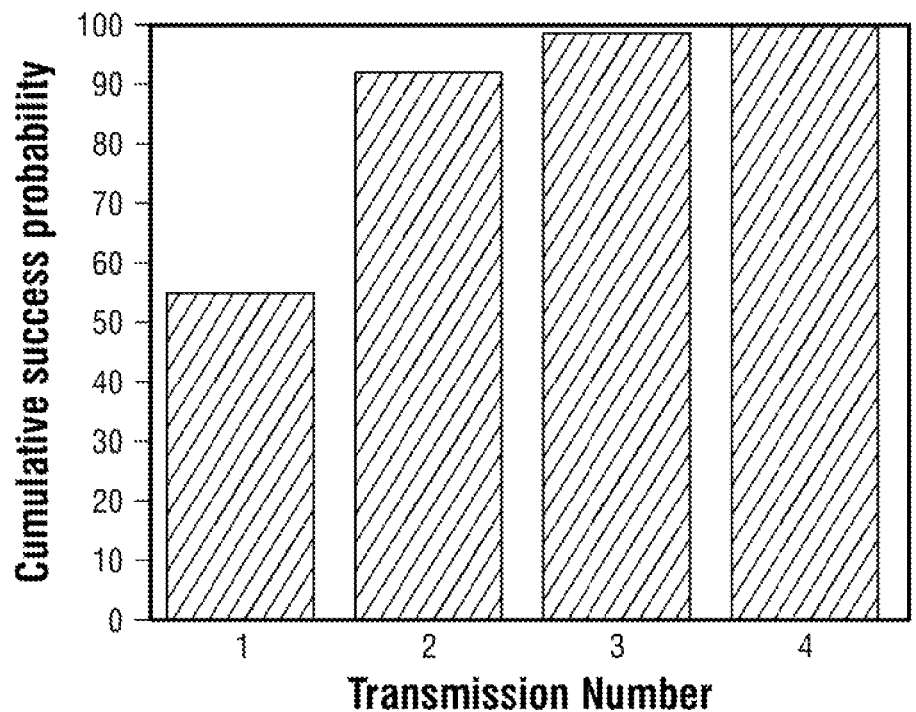
FIG. 2 shows the cumulative success probability for 120 Kmph channel.

FIG. 1 shows the typical cumulative success probabilities for 3 Kmph channel. Here we assumed link adaptation is done with 10% FER target. We can see that in the first transmission more than 97% packets will pass. Compare to this FIG. 2 where the success probability in the first attempt is 55%. This means that for slow speed UEs ACK/NAK bundling is useful since most of the packets will pass in the $1^{st}$ attempt, while for high speed UEs ACK/NAK multiplexing will be more useful. Table 2 shows the cumulative success probabilities for 3 and 120 Km/h channels.

TABLE 2 cumulative success probabilities for 3 and 120 Km/h channels.

| | cumulative success probabilities | |
|---|---|---|
| Transmission number | 3 Kmph channel | 120 Kmph channel |
| 1 | 0.97 | 0.55 |
| 2 | 0.99 | 0.92 |
| 3 | 1.00 | 1.00 |

Algorithm

The steps to implement the algorithm are as follows:

Step 1: Assuming a new cycle starts and the UE is ready for downlink scheduling. Set the speed flag=0. If the UE is at the cell edge, Go Step 4.

Step 2: Measure the UE speed.

Step 3: If the UE speed flag is on (means higher speed), then use ACK/NAK multiplexing for this UE. Go to Step 5.

Step 4: Use ACK/NAK bundling for this UE.
Step 5: Cycle Stops.

There are many techniques to decide an UE is at cell edge or not. Here we outline 4 methods to decide a particular UE is at cell edge or not. Note that, the invention works for any algorithm other than these methods.

Method 1: Based on Downlink Scheduling

If for a certain period of time eNB assigns lower modulation and coding schemes, then we can decide that particular UE is at the cell edge.

Method 2: Based on CQI Reporting by UE

The main idea behind this method is that in general at cell edges the SINR is very low. For example, if we over a period of time if the UE reports lower CQI, we can conclude that the corresponding UE is at the cell edge.

Method 3: Based on Neighbor List

If the neighbors list at the enB is greater than some predetermined number, we can conclude that the corresponding UE is at the cell edge.

Method 4: Based on Uplink Measurements

From the uplink measurements, for example UE pilot signal or SRS we can decide the UE is at cell edge or not based on the signal strength.

The speed flag can be set according to any one of the following methods. Note that, the invention works for any algorithm other than these methods. Please observe that this criterion is used to tell whether the speed of the UE is greater than some threshold. Few methods to determine are as follows:
1. Speed.
2. Frequency locations
3. Channel Quality Information
4. PMI Observe that these parameters can be obtained from the uplink pilot/SRS.
1. Speed Savg (average over k TTI)
If Savg>Tspeed Km/hr then speed flag=1
2. Frequency Location change rate (over k TTI)
$\Delta F/\Delta t > T$ adaptation then speed flag=1
3. Rate of Change of CQI (over k TTI)
If $\Delta CQ/\Delta t > T\_CQI$ then speed flag=1
4. Rate of Change of PMI (over k TTI)
If $\Delta PMI > T\_PMI$ then speed flag=1

Figure 3:
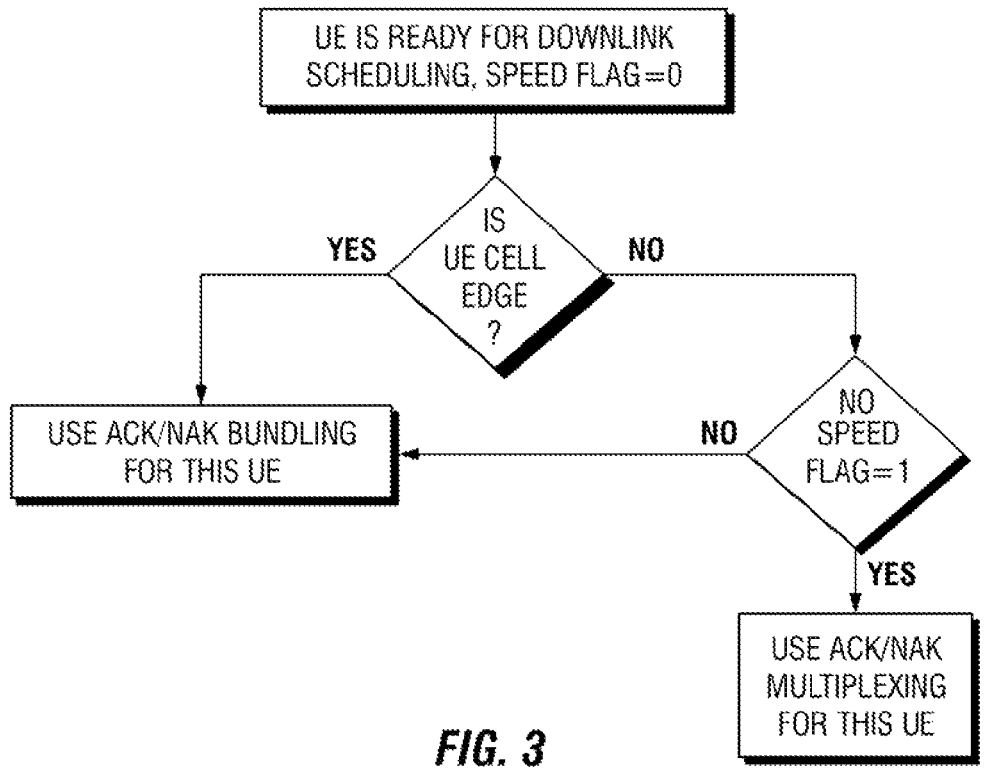
FIG. 3 is a flow chart for the algorithm of the present invention.

The flow chart for the algorithm is shown in FIG. 3.

Figure 5:
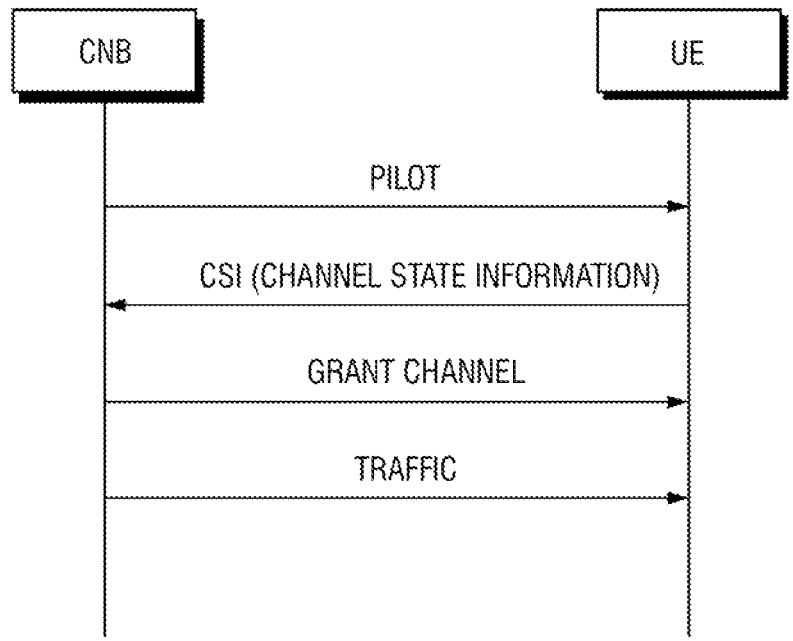
FIG. 5 shows the message sequences between the base station and the UE.

FIG. 5 shows the message sequence between the base station and the UE.

Figure 6:
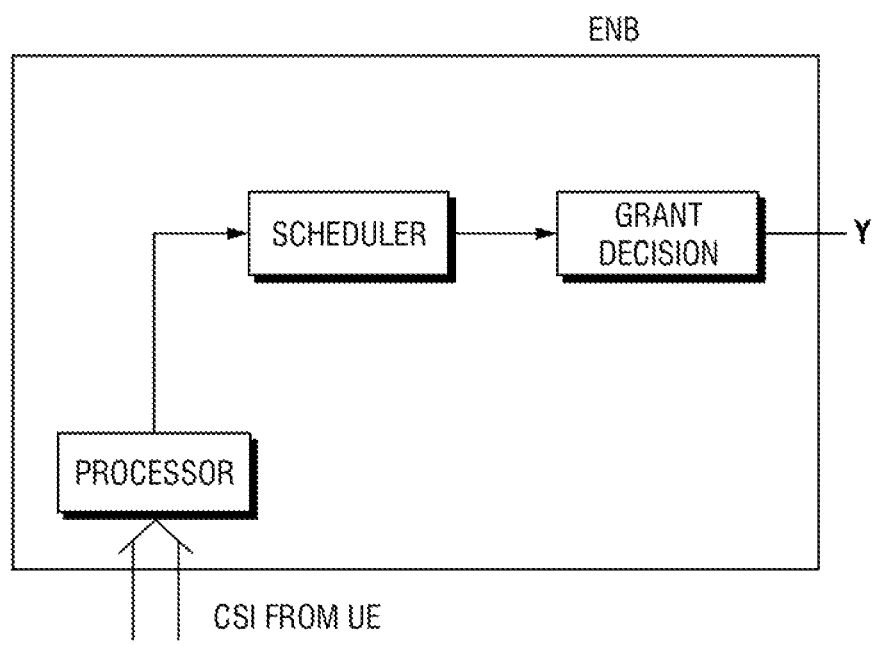
FIG. 6 is a block diagram regarding grant decision at the base station.

FIG. 6 shows the scheduling and grant allocation operation at the base station. Once the UE reports are collected, the users are scheduled according to predetermined decision criteria/metric. For example a round robin or proportional fair (PF) metric may be used. The metric is chosen for each user and the user with the highest metric is served during a specific duration. The metric is updated for each time interval.

1. The technique described herein is simple to implement and does not require any standards change.
2. The technique described herein gives significant coverage improvement due to less control signaling in the uplink.
3. The technique described herein is easy to identify for IPR infringement in a lab environment.

It should be noted that this innovation is not only limited to WCS spectrum. It can be applied to any other spectrum employing ACK/NAK multiplexing and bundling.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A base station of a wireless time division duplex (TDD) network which communicates with user equipment (UE) comprising:
    a network interface unit; and
    a processing unit which determines, based on one or more predetermined criteria, to use either:
        acknowledge or non-acknowledge (ACK/NAK) bundling, or
        ACK/NAK multiplexing
    to communicate with the UE through the network interface unit,
    wherein the ACK/NAK bundling and ACK/NAK multiplexing are used in an LTE-TDD transmission format.

2. The base station of claim 1 wherein the one or more predetermined criteria is based on the UE's location.

3. The base station of claim 2 wherein when the UE's location is near a cell edge in the wireless TDD network which comprises multiple cells, the processing unit determines ACK/NAK bundling is to be used, otherwise the processing unit determines ACK/NAK multiplexing is to be used.

4. The base station of claim 3 wherein the UE is near a cell edge when the UE's signal to noise ratio is less than a predetermined threshold.

5. The base station of claim 4 wherein the UE is near a cell edge when the network interface unit receives a Channel Quality Information (CQI) lower than 5.

6. The base station of claim 3 including a memory having a neighbor list having a number of neighbors, and wherein the UE is near a cell edge when the number of neighbors in the neighbor list is greater than a predetermined number of neighbors.

7. The base station of claim 3 wherein the UE is near a cell edge based on uplink measurements made by the processing unit with respect to the UE.

8. The base station of claim 1 wherein the one or more predetermined criteria is based on the UE's speed.

9. The base station of claim 8 wherein when the UE's speed is less than a predetermined threshold, the processing unit determines ACK/NAK bundling is to be used; otherwise, the processing unit determines ACK/NAK multiplexing is to be used.

10. The base station of claim 1 wherein when the UE's frequency of location change is less than a predetermined threshold, the processing unit determines ACK/NAK bundling is to be used; otherwise, the processing unit determines ACK/NAK multiplexing is to be used.

11. The base station of claim 1 wherein when the UE's rate of change of Channel Quality Information (CQI) is less than a predetermined threshold, the processing unit determines ACK/NAK bundling is to be used; otherwise, the processing unit determines ACK/NAK multiplexing is to be used.

12. The base station of claim 1 wherein when the UE's rate of change of PMI is less than a predetermined threshold, the processing unit determines ACK/NAK bundling is to be used; otherwise, the processing unit determines ACK/NAK multiplexing is to be used.

13. A method of a base station of a wireless time division duplex (TDD) network which communicates with user equipment (UE) to choose either acknowledge or non-acknowledge (ACK/NAK) bundling or ACK/NAK multiplexing comprising the steps of:

determining with a processing unit of the base station, based on one or more predetermined criteria, to use either:
ACK/NAK bundling, or
ACK/NAK multiplexing
to communicate with the UE through a network interface unit of the base station; and
communicating with the UE through the network interface unit using either ACK/NAK bundling or ACK/NAK multiplexing in accordance with the determination of the processing unit,
wherein the ACK/NAK bundling and ACK/NAK multiplexing are used in an LTE-TDD transmission format.

14. The method of claim 13 wherein the one or more predetermined criteria is based on the UE's location.

15. The method of claim 14 including the step of the processing unit determining ACK/NAK bundling is to be used when the UE's location is near a cell edge in the wireless TDD network; otherwise, the processing unit determines ACK/NAK multiplexing is to be used.

16. The method of claim 13 wherein the one or more predetermined criteria is based on the UE's speed.

17. The method of claim 16 including the step of the processing unit determining ACK/NAK bundling is to be used when the UE's speed is less than a predetermined threshold, otherwise, the processing unit determines ACK/NAK multiplexing is to be used.

18. The method of claim 13 including the step of the processing unit determining ACK/NAK bundling is to be used when the UE's location change rate is less than a predetermined threshold, otherwise, the processing unit determines ACK/NAK multiplexing is to be used.

19. The method of claim 13 including the step of the processing unit determining ACK/NAK bundling is to be used when the UE's rate of change of Channel Quality Information (CQI) is less than a predetermined threshold, otherwise, the processing unit determines ACK/NAK multiplexing is to be used.

20. The method of claim 13 including the step of the processing unit determining ACK/NAK bundling is to be used when the UE's rate of change of PMI is less than a predetermined threshold, otherwise, the processing unit determines ACK/NAK multiplexing is to be used.

* * * * *